United States Patent
Hallot et al.

(10) Patent No.: US 11,306,848 B2
(45) Date of Patent: Apr. 19, 2022

(54) METHOD FOR ASSEMBLING PIPE-IN-PIPE PIPELINE ELEMENTS FOR TRANSPORTING FLUIDS

(71) Applicant: SAIPEM S.A., Montigny le Bretonneux (FR)

(72) Inventors: Raymond Hallot, Voisins le Bretonneux (FR); Vincent Cocault-Duverger, Herbeville (FR)

(73) Assignee: SAIPEM S.A., Montigny le (FR)

( * ) Notice: Subject to any disclaimer, the term of this patent is extended or adjusted under 35 U.S.C. 154(b) by 113 days.

(21) Appl. No.: 16/965,819

(22) PCT Filed: Jan. 24, 2019

(86) PCT No.: PCT/FR2019/050158
§ 371 (c)(1),
(2) Date: Jul. 29, 2020

(87) PCT Pub. No.: WO2019/150022
PCT Pub. Date: Aug. 8, 2019

(65) Prior Publication Data
US 2021/0054952 A1    Feb. 25, 2021

(30) Foreign Application Priority Data
Feb. 1, 2018    (FR) ..................... 18 50856

(51) Int. Cl.
*F16L 13/02*    (2006.01)
*F16L 39/00*    (2006.01)
(Continued)

(52) U.S. Cl.
CPC .............. *F16L 13/02* (2013.01); *B21D 39/04* (2013.01); *B23P 11/00* (2013.01); *F16L 39/005* (2013.01); *B23K 2101/10* (2018.08)

(58) Field of Classification Search
CPC ......... F16L 13/02; F16L 39/005; F16L 1/161; F16L 1/19; F16L 9/18; F16L 59/20;
(Continued)

(56) References Cited

U.S. PATENT DOCUMENTS 8,555,930 B2    10/2013  Pionetti
10,197,195 B2    2/2019  Pionetti
(Continued)

FOREIGN PATENT DOCUMENTS

FR      3032511 A1    8/2016
WO      0212773 A1    2/2002
WO    2011007075 A1    1/2011

OTHER PUBLICATIONS

International Search Report and Written Opinion from PCT Application No. PCT/FR2019/050158, dated May 21, 2019.
(Continued)

*Primary Examiner* — Lee A Holly
(74) *Attorney, Agent, or Firm* — Workman Nydegger

(57) ABSTRACT

A method for assembling pipe-in-pipe pipeline elements for transporting fluids, with each pipeline element comprising an inner pipe including a bulge at one end, and an outer pipe including a recess at one end. The method comprises the successive steps: inserting a first locking wedge axially abutting the bulge of its inner pipe and a corresponding end of its outer pipe, butt-assembling the inner pipe of a new pipeline element on the inner pipe of the pipeline, positioning the outer pipe of the new pipeline element alongside the outer pipe of the pipeline, and butt-assembling the outer pipe of the new pipeline element on the outer pipe of the pipeline by inserting a second locking wedge axially abutting against the bulge of the inner pipe of the pipeline at its free end and the recess of the outer pipe at a corresponding end thereof.

10 Claims, 4 Drawing Sheets

(51) Int. Cl.
*B23P 11/00* (2006.01)
*B23K 101/10* (2006.01)
*B21D 39/04* (2006.01)

(58) Field of Classification Search
CPC ....... F16L 1/15; F16L 1/20; F16L 9/20; F16L 9/22; B21D 39/04; B23P 11/00; B23K 2101/10; E21B 17/18
See application file for complete search history.

(56) References Cited

U.S. PATENT DOCUMENTS

| | | |
|---|---|---|
| 10,989,331 B2 * | 4/2021 | Cocault-Duverger .... F16L 9/18 |
| 2012/0192985 A1 | 8/2012 | Pionetti |
| 2018/0038520 A1 | 2/2018 | Pionetti |

OTHER PUBLICATIONS

French Search Report from corresponding FR Application No. FR1850856, dated Oct. 4, 2018.

* cited by examiner

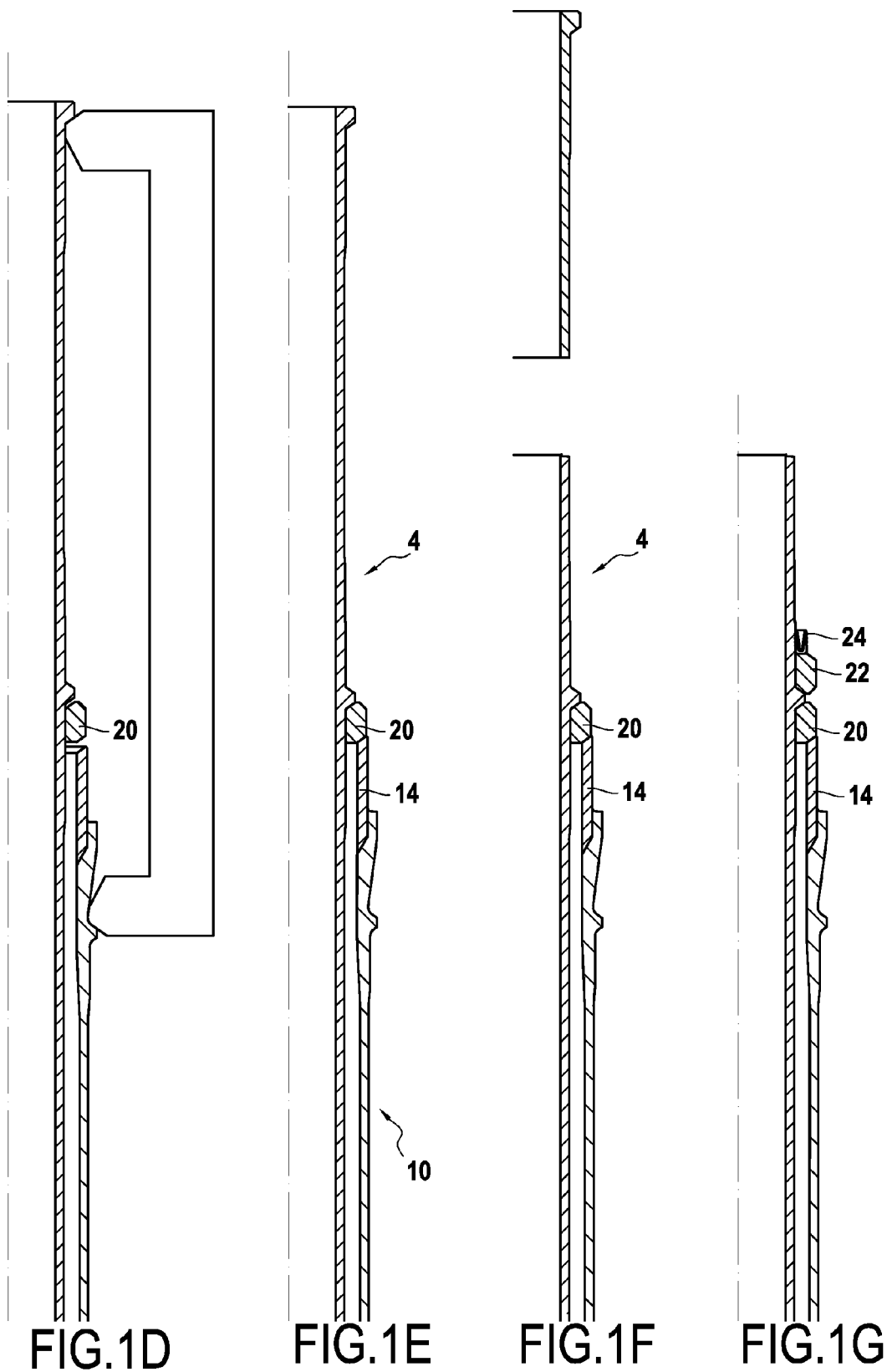

METHOD FOR ASSEMBLING PIPE-IN-PIPE PIPELINE ELEMENTS FOR TRANSPORTING FLUIDS

BACKGROUND OF THE INVENTION

The present invention relates to the general field of the offshore construction of subsea pipelines lying at the bottom or ensuring the bottom-surface connection for the transfer of hydrocarbons, for example of oil and gas, derived from subsea production wells.

It relates more precisely to the subsea pipelines of the "Pipe In Pipe" or PIP type, in which an inner pipe transports the fluids and an outer pipe coaxial with the inner pipe is in contact with the surrounding environment, that is to say with sea water.

The annular space between the two pipes can be filled with an insulating material or even emptied of any gas so as to ensure thermal insulation for the fluids circulating in the inner duct. Such subsea coaxial pipelines are particularly used within the framework of installations at great depths where the water temperature is typically 4° C., or for long connections.

Generally, the pipe-in-pipe subsea pipelines are assembled on shore into a plurality of pipeline sections called "strings", each pipeline section being produced from one or several unit pipeline elements, on the order of 10 to 1000 m depending on the holding capacity in charge of the laying system. These pipeline sections are then transported offshore on a ship where they are connected to each other as they are laid at sea (by a method known as J, S, reel-lay or floated—section method).

The laying techniques require connecting each new pipeline section to the pipeline already installed at sea before lowering this new pipeline section into the sea by moving the laying ship forward. This connection step is typically carried out by butt-welding the free steel ends of the respective inner and outer pipes of the new pipeline section and of the pipeline already installed at sea.

Furthermore, when the pipeline installed on the seabed is in service and the temperature of the fluid it transports reaches moderate to high temperatures (on the order of 50 to 150° C.), the increase in temperature causes an expansion of the inner pipe of the different sections of the pipeline compared to their colder outer pipe (because insulated and in contact with sea water at a low temperature on the order of 3 to 5° C.). This expansion of the inner pipe of the pipeline sections results in a compression of the inner pipe, the latter being indeed blocked at each end of the subsea pipeline by the elements of closing the annular space between the two pipes.

During the laying, the inner pipes of the various pipeline sections compress under their own weight. This weight is transmitted to the outer pipeline at their connection and is balanced by a tensile stress in the outer pipeline. The low portion of the pipeline being also subject to a bending movement, it can result in too much combined force if the mechanical connections between the two pipelines are too distant. In addition, a compressive pre-stress is captured during the construction. Combined with the temperature rise during the service phase, these forces can cause the buckling of the pipeline on the seabed, and if this buckling is too severe, the structure may be destroyed. Indeed, when it rests on the seabed, the pipeline is restricted in its movements by its environment. Under the combined effect of the pressure and temperature inside the inner pipe, a risk of damage to the pipeline results from these movements.

In order to limit these effects, it is known to position intermediate forged steel anchoring parts (called "intermediate blukheads") between the inner pipe and the outer pipe of the pipeline. These intermediate anchoring parts in particular allow transferring the mechanical stresses undergone by the inner pipe during the laying of the pipeline towards the outer pipe. They are generally positioned every kilometer along the pipeline, but this interval can be increased or decreased depending on the specific conditions of the laying, on the properties of the pipeline and on the water depth.

The use of intermediate anchoring parts requires not only having such forged steel parts, but also incorporating them into the pipeline when laying it from the ship. The incorporation of these parts requires the weld of two half-shells on the outer pipe of the pipeline to join end to end the outer pipe following the anchoring of the intermediate parts. However, this weld is slow to produce and has a longitudinal component which is difficult to guarantee with an appropriate quality level.

To avoid the use of intermediate anchoring parts, document FR 3,032,511 discloses an anti-slip and self-centering device which is positioned between the inner pipe and the outer pipe of the pipeline during its laying. This device, which is in the form of an elastomeric annulus sandwiched between two metal plates which are tightened to compress the annulus, allows ensuring maintenance and concentricity of the inner pipe inside of the outer pipe. However, the mechanical stresses taken up by this device are limited, on the order of 2 to 5 tons-force.

Document WO 2011/007075 also discloses the use of intermediate anchoring parts whose incorporation into the pipeline does not require the weld of half-shells. These anchoring parts nevertheless constitute a cold thermal bridge from the outer pipe to the inner pipe of the pipeline which is detrimental.

OBJECT AND SUMMARY OF THE INVENTION

The main object of the present invention is therefore to overcome such drawbacks by proposing an assembly method that allows overcoming the intermediate anchoring parts and the half-shells while substantially limiting the thermal bridge between the outer pipe and the inner pipe of the pipeline.

According to the invention, this object is achieved by a method for assembling pipe-in-pipe pipeline elements for transporting fluids, each pipeline element comprising an inner pipe intended to receive the fluids to be transported and comprising at one end a bulge at an outer face, and an outer pipe intended to be positioned around the inner pipe while being coaxial therewith and comprising at one end a recess at an inner face, the method comprising the successive steps:

placing the first pipeline element by inserting at a free end thereof a first annular locking wedge axially abutting between the bulge of its inner pipe and a corresponding end of its outer pipe;

butt-assembling the inner pipe of a new pipeline element on the inner pipe of the first pipeline element at the free end thereof;

positioning the outer pipe of the new pipeline element alongside the outer pipe of the first pipeline element by sliding it along its inner pipe; and butt-assembling the outer pipe of the new pipeline element on the outer pipe of the first pipeline element by inserting beforehand a second annular locking wedge axially abutting against the bulge of the inner pipe of the first pipeline element at its free end and the recess of the outer pipe of the new pipeline element at a corresponding end thereof.

The method according to the invention plans to use a bulge at the inner pipe and a recess at the outer pipe of each new pipeline element to be assembled so as to create a double mechanical stop when the two pipes slide over each other during the laying. Particularly, thanks to the presence of two locking wedges and bulges and recesses, the outer and inner pipes are blocked longitudinally relative to one another in both directions. This double mechanical stop allows dispensing with the use of intermediate anchoring parts made of forged steel.

In addition, this double mechanical stop allows transmitting the axial forces between the two pipes of the pipeline element during the laying, in particular during a J-lay. By the same mechanism, this double mechanical stop allows limiting, or even reversing the compressive pre-stress induced in the inner pipe of the pipeline by the laying operation. In addition, this double mechanical stop allows transmitting the axial forces between the two pipes of the pipeline when it is put into service. Finally, the locking wedges used in the method according to the invention are preferably made of polymer, which very significantly limits the thermal bridge created between the outer pipe and the inner pipe of the pipeline.

The method may further comprise, before placing the pipeline, the construction of the pipeline in a welding station.

In this case, the construction of the pipeline may comprise the successive steps: maintaining a pipeline element in the laying tower, positioning a separating ring at the free end of the outer pipe of the pipeline element, positioning and activating a tensioning device alongside and on the pipeline element in order to stretch the inner pipe of the pipeline element by a predetermined length, positioning the first annular locking wedge, transferring the load of the tensioning device to the first locking wedge and to the separating ring, and withdrawing the tensioning device.

Preferably, the recess of the outer pipe of the new pipeline element extends longitudinally over a distance sufficient to cover the first and second locking wedges.

Also preferably, the second locking wedge extends longitudinally over a length greater than that of the first locking wedge in order to facilitate the weld repair operations.

An annular seal can be positioned around the inner pipe of the new pipeline element by abutting against the second locking wedge or against a mechanical stop arranged on the inner pipe in order to limit the accidental water infiltrations within the annular space between the inner and outer pipes of the pipeline.

More preferably, the first and second locking wedges are segmented and are made of polymer.

The butt-assembly of the inner pipe of a new pipeline element on the inner pipe of the pipeline at the free end thereof can be made by depositing a weld bead. In addition, positioning the outer pipe of the new pipeline element alongside the outer pipe of the pipeline can be made by means of a centering tooling.

BRIEF DESCRIPTION OF THE DRAWINGS

Other characteristics and advantages of the present invention will emerge from the description below, with reference to the appended drawings which illustrate exemplary embodiments thereof without any limitation. In the figures:

FIGS. 1A to 1K illustrate different steps of the method for assembling pipe-in-pipe pipeline elements according to the invention.

DETAILED DESCRIPTION OF THE INVENTION

The invention applies to the laying (or offshore construction) of a subsea pipeline of the "Pipe In Pipe" (or PIP) type, that is to say a pipeline which comprises an inner pipe intended to transport hydrocarbons derived from production wells and an outer pipe disposed around the inner pipe while being coaxial therewith and intended to be in direct contact with the surrounding sea water.

This type of subsea pipeline is typically used in the offshore production of hydrocarbons at a large depth. Within the context of such installations, the pipe in pipe pipelines can be assembled on shore into several pipeline sections, each pipeline section being formed from one or more unit length element(s) (also known as "strings"), on the order of 10 to 100 m depending on the holding capacity of the laying system.

During the (in J or S) lay, the pipeline sections are connected to each other on board the ship and as they are installed at sea. More precisely, with the J-lay, the seabed pipeline is typically lowered from the practically vertical laying ship (between +30° and −10° relative to the vertical). This almost vertical inclination of the pipeline decreases as it moves downward until it follows the slope of the seabed. With the S-lay, the subsea pipeline is typically lowered from the practically horizontal laying ship and then bends to reach the seabed. Of course, the invention also applies to the construction of a pipe in pipe pipeline by a reel-lay method.

FIGS. 1A to 1K illustrate the different steps on a J-lay ship of a pipe in pipe pipeline according to one embodiment of the assembly method according to the invention.

Figure 1A:
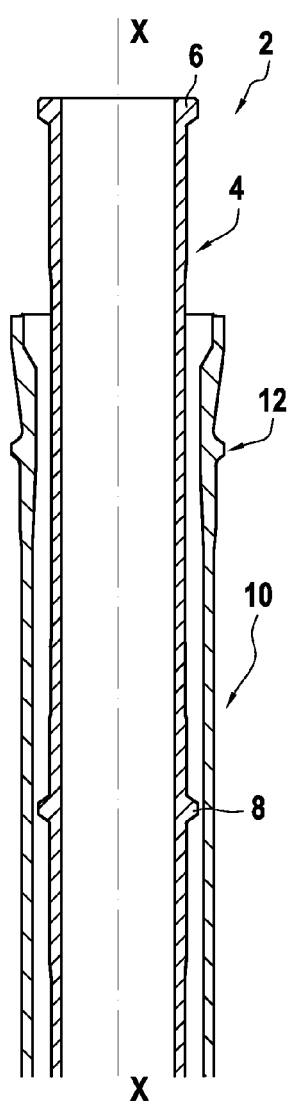

FIG. 1A represents in a vertical position, a pipeline element 2 centered on a longitudinal axis X-X and intended to form the pipe in pipe pipeline according to the invention.

This pipeline element 2 comprises an inner pipe 4 which is intended to receive the fluids to be transported, this inner pipe 4 comprising, at a free end, a tensioning shoulder 6 radially protruding at an outer face, and a bulge 8 longitudinally offset from its free end.

The pipeline element 2 also comprises an outer pipe 10 which is intended to be positioned around the inner pipe by being coaxial therewith, this outer pipe 10 comprising in particular a tensioning shoulder 12 radially protruding at an outer face.

The pipeline element 2 is maintained vertically in the welding station of a J-lay tower. A separating ring 14 can then be installed at the free end of the outer pipe 10 of the pipeline element. In addition to the function of axial force transmission, this separating ring 14 serves as a welding strip during butt-weld of the outer pipe described below. It is also possible to imagine that the separating ring is integrated directly into the body of the inner pipe of the pipeline element.

Figure 1B:
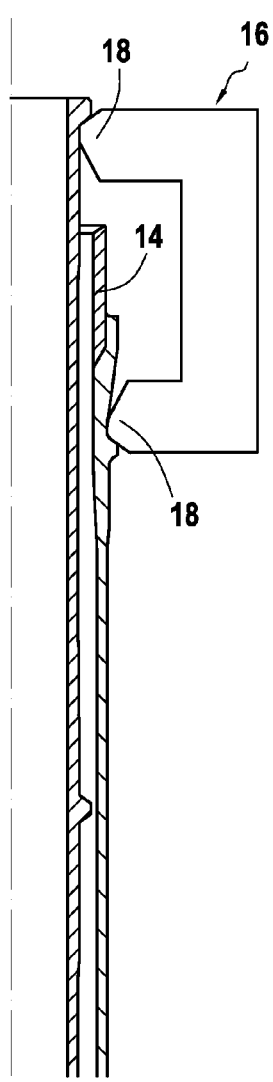

As represented in FIG. 1B, a plurality of hydraulic cylinders 16 (for example six in number) of a tensioning device are deployed around the pipeline element. These cylinders have jaws 18 which position, on the one hand alongside the tensioning shoulder 6 of the inner pipe, and on the other hand alongside the tensioning shoulder 12 of the outer pipe.

Figure 1C:
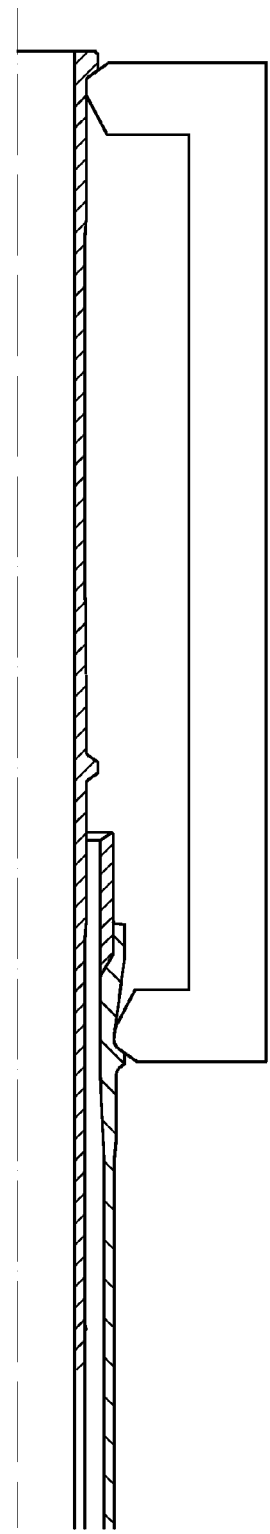

The cylinders 16 of the tensioning device are then deployed in order to stretch the inner pipe 4 of the pipeline element by a predetermined length (FIG. 1C). The travel of the cylinders is thus determined based on the length of the pipes of the pipeline element. Typically, this travel is on the order of a meter.

During the next step (FIG. 1D), a first annular locking wedge 20 is positioned axially in abutment between the bulge 8 of the inner pipe and a corresponding end of the outer pipe. In order to perform this operation without requiring specific tooling, the first annular locking wedge is segmented.

The load of the cylinders 16 of the tensioning device can then be transferred: the cylinders are retracted and after a slight downward travel (on the order of a few centimeters), the load is transferred to the first locking wedge 20 and to the separating ring 14. The tensioning device 16 is then withdrawn (FIG. 1E).

It will be noted that the tensioning of the pipeline element as described above has the advantage of limiting, or even eliminating the ancillary structures generally required to control the buckling of the pipeline or of managing the free spans and accumulated longitudinal movements, often called "pipe walking".

According to an optional step, it is then possible to install an annular seal around the inner pipe of the pipeline element to guarantee the sealing of the annular space between the inner and outer pipes. To this end, this step consists in cutting a portion 4a of the inner pipe 4 of the pipeline element in order to withdraw the tensioning shoulder 6 therefrom, then in chamfering the end of this inner pipe in order to carry out a welding operation (FIG. 1F). Note that when an elastomeric seal can be used, it is not useful to cut the inner pipe because the elasticity of this type of seal makes it possible to pass it over the bulge 6.

As represented in FIG. 1G, a second annular locking wedge 22 is then inserted to axially abut against the bulge 8 of the inner pipe of the pipeline at its free end and the end of the outer pipe 10.

An annular seal 24 can then be slid around the inner pipe 4 of the pipeline element, for example by using a specific tool, to abut against the second locking wedge 22.

Figures 1H, 1I, 1J, 1K:
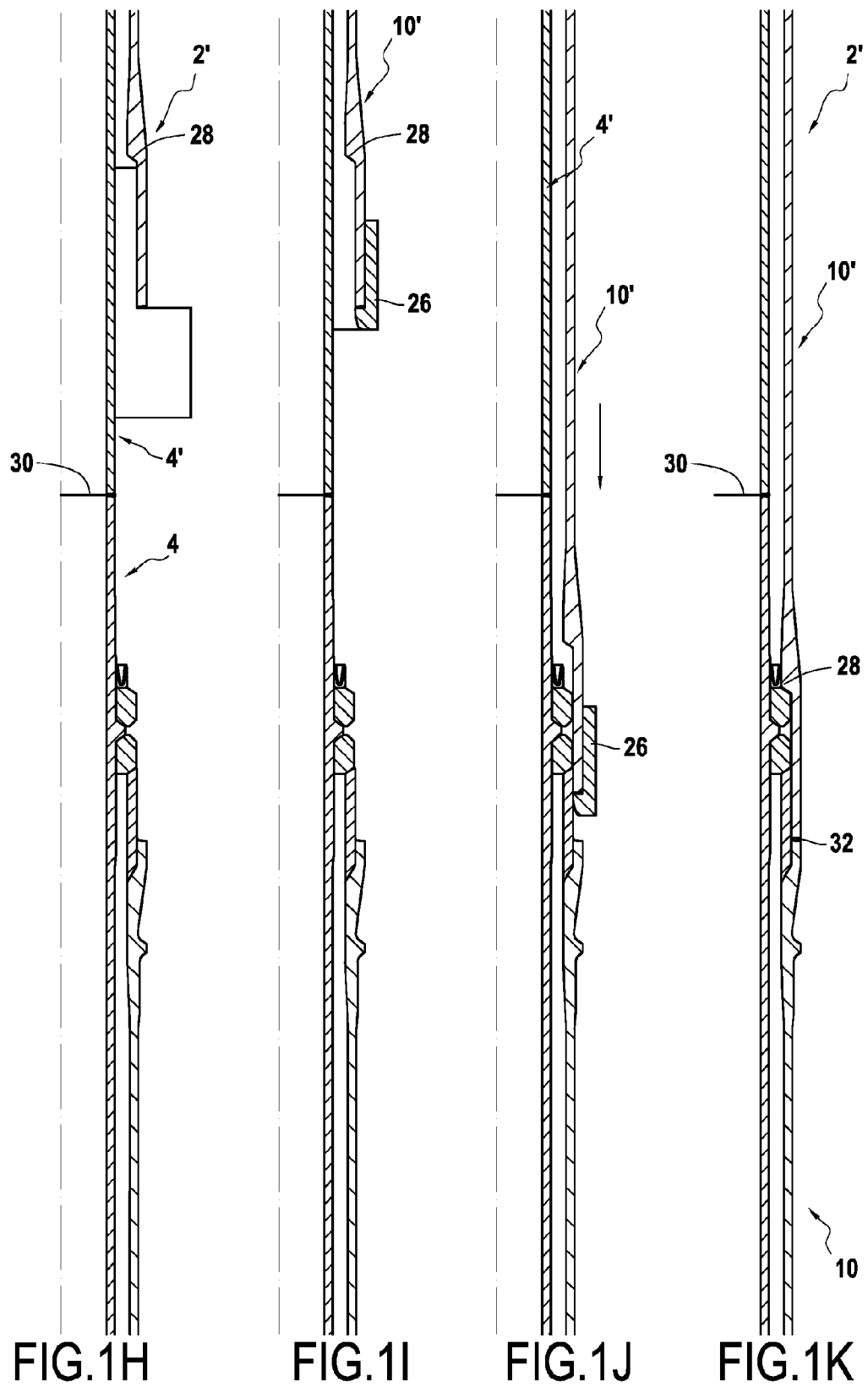

During the next step illustrated in FIG. 1H, the inner pipe 4' of a new pipeline element 2' is butt-assembled on the inner pipe 4 of the pipeline 2 thus constructed at the free end thereof. This assembly is carried out by depositing a weld bead 30 between these two inner pipes.

A centering tooling 26 consisting of two half-shells is then installed around the lower end of the outer pipe 10' of the new pipeline element 2', this lower end being provided with a recess 28 at its face inner (FIG. 1I).

The next step consists in positioning the outer pipe 10' of the new pipeline element 2' alongside the outer pipe 10 of the pipeline 2 by sliding it along its inner pipe 4' (FIG. 1J).

The centering tooling is retrieved, then a seal is placed and a weld bead 32 is deposited between the respective ends of the outer pipe 10' of the new pipeline element 2' and of the outer pipe 10 of the pipeline 2 (FIG. 1K).

It will be noted that the separating ring 14 serves as a welding strip during butt-weld of the outer pipe 10' of the new pipeline element 2' on the outer pipe 10 of the pipeline 2.

The previous steps are repeated as many times as necessary to obtain the desired length of the pipeline then the latter is lowered to the sea.

In relation to FIG. 2, there will now be described more precisely the assembly between the respective ends of the outer pipe 10' of the new pipeline element 2' and of the outer pipe 10 of the pipeline 2.

Figure 2:
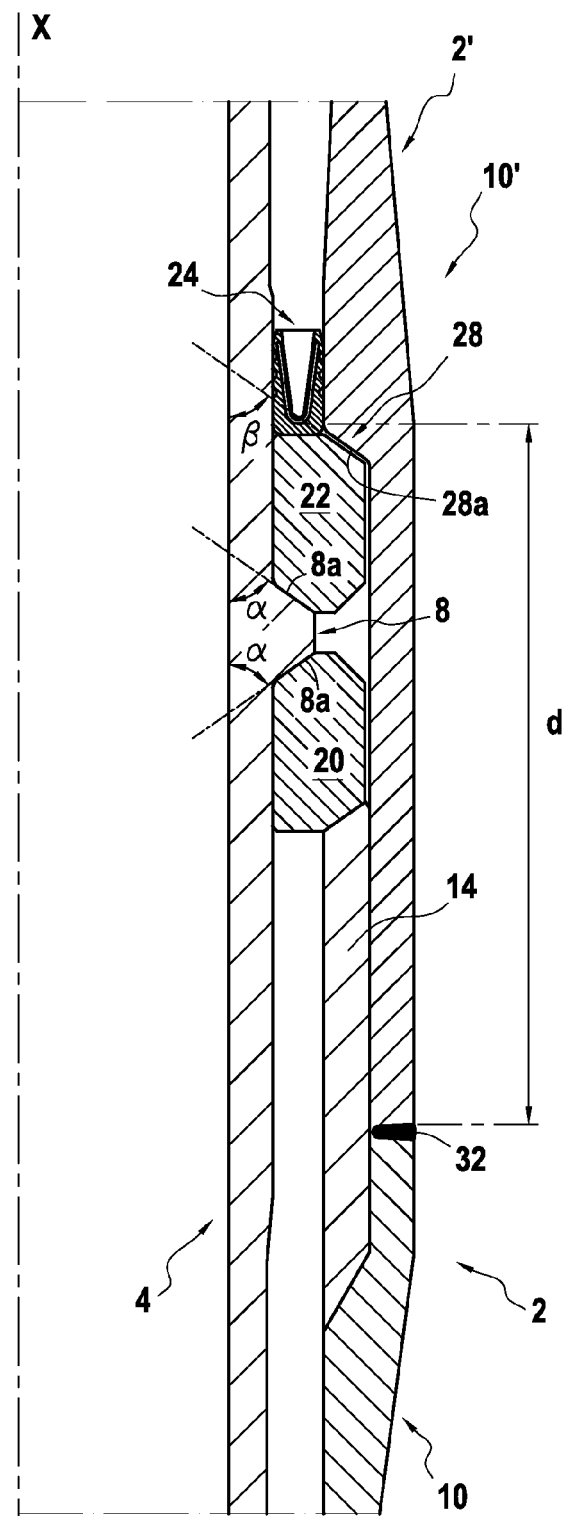
FIG. 2 is a sectional and partial view of a detail of FIG. 1K.

In this FIG. 2, the bulge 8 of the inner pipe 4 of the pipeline has two lateral flanks 8a each forming an angle α on the order of 60° with the longitudinal axis of the inner pipe.

Similarly, the recess 28 in the outer pipe 10' of the pipeline element 2' has a lateral flank 28a forming an angle β on the order of 60° with the longitudinal axis of the outer pipe.

The first and second locking wedges 20, 22 are in the form of wedge segments which have a polygon-shaped straight section (here a heptagon) with lateral flanks coming into contact with the respective lateral flanks of the bulge 8 of the inner pipe of the pipeline and the recess 28 of the outer pipe of the pipeline element.

It will be noted that the recess 28 of the outer pipe 10' preferably extends longitudinally over a distance d sufficient to cover the first and second locking wedges 20, 22. Thus, the butt-welding of the outer pipe 10' of the new pipeline element 2' on the outer pipe 10 of the pipeline 2 can be made at the separating ring 14 without damaging the first and second locking wedges 20, 22.

It will also be noted that the second locking wedge 22 can extend longitudinally over a length which is greater than that over which the first locking wedge 20 extends. This disposition allows facilitating the weld repair operations. Indeed, if the weld bead 32 were to be gouged over a typical length of about 20 mm, the procedure described in FIGS. 1I to 1K can be carried out in reverse, namely:

the outer pipe 10' is withdrawn;
the end of the outer pipe is provided with a chamfer;
the second annular locking wedge 22 is replaced with an annular wedge of reduced height of the gouged length;
the annular seal is slid to abut on this annular wedge; and
the two pipes 10 and 10' are sealed and welded.

The invention claimed is:

1. A method for assembling pipe-in-pipe pipeline elements for transporting fluids, each pipeline element comprising an inner pipe intended to receive the fluids to be transported and comprising at one end a bulge at an outer face, and an outer pipe intended to be positioned around the inner pipe while being coaxial therewith and comprising at one end a recess at an inner face, the method comprising the successive steps:

placing a first pipeline element by inserting at a free end thereof a first annular locking wedge axially abutting between the bulge of its inner pipe and a corresponding end of its outer pipe;

butt-assembling the inner pipe of a new pipeline element on the inner pipe of the first pipeline element at the free end thereof;

positioning the outer pipe of the new pipeline element alongside the outer pipe of the first pipeline element by sliding it along its inner pipe; and butt-assembling the outer pipe of the new pipeline element on the outer pipe of the first pipeline element by inserting beforehand a second annular locking wedge axially abutting against the bulge of the inner pipe of the first pipeline element at its free end and the recess of the outer pipe of the new pipeline element at a corresponding end thereof.

2. The method according to claim 1, further comprising, before placing the pipeline, the construction of the pipeline in a welding station.

3. The method according to claim 2, wherein the construction of the pipeline comprises the successive steps:
maintaining a pipeline element in the laying tower;
positioning a separating ring at the free end of the outer pipe of the pipeline element;
positioning and activating a tensioning device alongside the pipeline element in order to stretch the inner pipe of the pipeline element by a predetermined length;
positioning the first annular locking wedge;
transferring the load of the tensioning device to the first locking wedge and to the separating ring; and
withdrawing the tensioning device.

4. The method according to claim 1, wherein the recess of the outer pipe of the new pipeline element extends longitudinally over a distance sufficient to cover the first and second locking wedges.

5. The method according to claim 1, wherein the second locking wedge extends longitudinally over a length greater than that of the first locking wedge.

6. The method according to claim 1, wherein an annular seal is positioned around the inner pipe of the new pipeline element abutting against the second locking wedge or against a mechanical stop arranged on the inner pipe.

7. The method according to claim 1, wherein the first and second locking wedges are segmented.

8. The method according to claim 1, wherein the butt-assembly of the inner pipe of a new pipeline element on the inner pipe of the pipeline at the free end thereof is made by depositing a weld bead.

9. The method according to claim 1, wherein the first and second locking wedges are made of polymer.

10. The method according to claim 1, wherein positioning the outer pipe of the new pipeline element alongside the outer pipe of the pipeline is made by means of a centering tooling.

* * * * *